S. E. OVIATT.
GRAIN SEPARATOR.

No. 77,206. Patented Apr. 28, 1868.

Witnesses.
J. Holmes.
C. E. Waite.

Inventor.
S. E. Oviatt.

United States Patent Office.

S. E. OVIATT, OF RICHFIELD, OHIO.

Letters Patent No. 77,206, dated April 28, 1868.

IMPROVEMENT IN GRAIN-SEPARATORS.

The Schedule referred to in these Letters Patent and making part of the same.

TO ALL WHOM IT MAY CONCERN:

Be it known that I, S. E. OVIATT, of Richfield, in the county of Summit, and State of Ohio, have invented certain new and useful Improvements in Grain-Separators; and I do hereby declare that the following is a full and complete description of the same, reference being had to the accompanying drawings, making a part of this specification, in which—

Like letters of reference refer to like parts.

Figure 1:
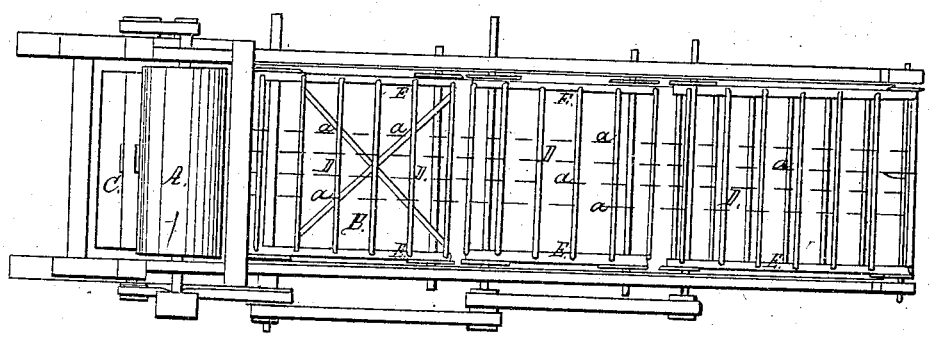
Figure 1 is a top view of the separator.

In fig. 1, A represents the cylinder of the machine, and C the blower or fan, in the rear of which is attached the elevator or carriers, B, consisting of the transverse bars D, the ends of which are connected to endless side-belts, E, whereby they are carried around on the wheels F, as and for a purpose hereafter shown.

Figure 2:
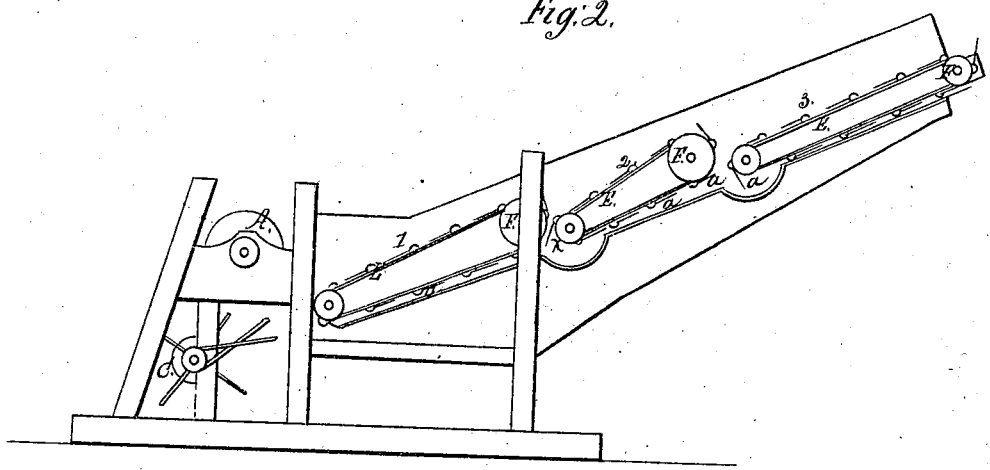
Figure 2 is a side view of the same.

The transverse bars referred to are armed with fingers, a, the direction of which, as they are carried upward, is in the line of motion as shown in fig. 2, but change from this position as they pass around the wheel, as shown at x, for a purpose presently explained.

The usual manner of constructing elevators for threshing-machines is by the employment of one entire endless belt, or if in sections, as is frequently done, the sections are all arranged in a right line with each other. The objection to either of these carriers is, that the straw is quietly carried upward, and most of the grain that may have passed through the cylinder is carried up with it, and thrown out upon the stack, and hence lost, which, under some circumstances, is by no means inconsiderable, and more especially if the machine is fed fast and run with full power. In order to prevent this waste of grain, and at the same time continue the elevation of the straw, I construct the carriers or aprons in sections more or less in number, as the distance the straw is to be thrown.

In the drawing, three sections are represented, 1, 2, 3, each section being an endless apron complete in itself; the lower end of the first section receiving the straw directly from the cylinder, and carries it up and drops it down upon the lower end of the second section, which in turn carries it and drops it down upon the lower end of the third section, &c., the sections being so arranged that the upper ends are elevated above the lower end of each respective successive section, so that as the straw passes from one to the other, on its way to the stack, it is dropped, thereby disturbing the quiet of the straw, so that the grain that may be lodged in it is shaken out and falls down through the carriers saved.

The straw, as it is passed from one carrier to the other, is so agitated and thrown about as to act as beaters in separating the grain from the straw, and thus dispensing with the old mode of beaters or whippers.

The straw is prevented from falling between the ends of the sections by the fingers a referred to, which, as they pass around, are thrown out across the space between the ends of each section, the fingers, in their movement, passing between each other, and thereby prevent the straw from becoming lodged or tangled. They also disturb the quiet of the straw, thereby arresting the escape of the loose grain.

By this arrangement of the carriers or aprons, little or no grain can escape with the straw, it being shaken out in the dropping of the straw from one section to another.

What I claim as my improvement, and desire to secure by Letters Patent, is—

1. A grain-separating conveyer constructed in sectional carriers, B, provided with bars D and fingers a, so arranged that the axis of the lower end of one carrier is below the axis of the upper end of the next lower carrier, substantially as and for the purpose set forth.

2. A conveyer or carrier constructed in sections, with each section provided with bars D and fingers, so arranged that the fingers of one sectional carrier will interlap with the fingers in the adjoining carrier, as and for the purpose set forth.

3. The carrier sections so arranged in relation to each other, when provided with bars D and fingers a, that the plane or upper end of one carrier shall be above the lower end of the next succeeding carrier, substantially as and for the purpose set forth.

S. E. OVIATT.

Witnesses:
W. H. BURRIDGE,
J. HOLMES.